US007533374B2

(12) United States Patent
Rudelic et al.

(10) Patent No.: US 7,533,374 B2
(45) Date of Patent: May 12, 2009

(54) ADAPTIVELY STORING SYSTEM CODE IN NON-VOLATILE STORAGE

(75) Inventors: John C. Rudelic, Folsom, CA (US); August A. Camber, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 1010 days.

(21) Appl. No.: 10/461,281

(22) Filed: Jun. 12, 2003

(65) Prior Publication Data
US 2004/0255283 A1 Dec. 16, 2004

(51) Int. Cl.
*G06F 9/45* (2006.01)
(52) U.S. Cl. .................................... 717/151
(58) Field of Classification Search ......... 717/168–169, 717/174–175, 151
See application file for complete search history.

(56) References Cited

U.S. PATENT DOCUMENTS

| 5,449,340 | A | * | 9/1995 | Tollini ........................... 602/58 |
| 5,604,906 | A | * | 2/1997 | Murphy et al. ............... 717/162 |
| 5,887,192 | A | * | 3/1999 | Nishio ........................... 710/7 |
| 5,925,127 | A | * | 7/1999 | Ahmad ......................... 726/31 |
| 6,006,034 | A | * | 12/1999 | Heath et al. .................. 717/170 |
| 6,080,207 | A | * | 6/2000 | Kroening et al. ............. 717/172 |
| 6,108,697 | A | * | 8/2000 | Raymond et al. ............ 709/218 |
| 6,182,188 | B1 | * | 1/2001 | Hasbun et al. ............... 711/103 |
| 6,205,548 | B1 | * | 3/2001 | Hasbun ......................... 713/2 |
| 6,247,175 | B1 | * | 6/2001 | Ledford et al. .............. 717/157 |
| 6,418,506 | B1 |   | 7/2002 | Pashley et al. .............. 711/103 |
| 6,477,624 | B1 | * | 11/2002 | Kedem et al. ................ 711/147 |
| 6,574,717 | B1 | * | 6/2003 | Ngai et al. ................... 711/147 |
| 6,606,651 | B1 | * | 8/2003 | Linde ........................... 709/216 |
| 6,615,365 | B1 | * | 9/2003 | Jenevein et al. ................ 714/6 |
| 6,662,314 | B1 | * | 12/2003 | Iwata et al. .................... 714/42 |

(Continued)

OTHER PUBLICATIONS

Intel® Flash Data Integrator (FDI) Support for Java* Applications—Application Note 744; Feb. 2001; Author: Intel®.

(Continued)

*Primary Examiner*—John Chavis
(74) *Attorney, Agent, or Firm*—Trop, Pruner & Hu, P.C.

(57) ABSTRACT

A program different than an operation system may be utilized to partially update an original image of system code. In one embodiment, operating system code may be adaptively stored and updated within a non-volatile storage device across at least two different memories into at least two code objects based on the relative utilization of the system code in the two code objects. Operating system patching or application and driver updates may be provided without re-writing an entire image of operating system code in some embodiments. The tuning of operating system code storage may be implemented based on a usage pattern of the operating system code on a device in some cases.

21 Claims, 6 Drawing Sheets

U.S. PATENT DOCUMENTS

| | | | |
|---|---|---|---|
| 6,760,708 B1 * | 7/2004 | Hubbard et al. | 705/27 |
| 6,785,787 B2 * | 8/2004 | Smith et al. | 711/162 |
| 6,804,689 B1 * | 10/2004 | Havrda et al. | 707/204 |
| 6,807,665 B2 * | 10/2004 | Evans et al. | 717/175 |
| 6,857,011 B2 * | 2/2005 | Reinke | 709/220 |
| 6,915,524 B2 * | 7/2005 | Crowley et al. | 719/321 |
| 6,920,555 B1 * | 7/2005 | Peters et al. | 713/100 |
| 6,990,577 B2 * | 1/2006 | Autry | 713/100 |
| 6,990,661 B2 * | 1/2006 | Dobbek | 717/174 |
| 7,007,159 B2 * | 2/2006 | Wyatt | 713/1 |
| 7,047,386 B1 * | 5/2006 | Ngai et al. | 711/170 |

OTHER PUBLICATIONS

U.S. Appl. No. 10/331,569, filed Dec. 30, 2002; entitled Using System Memory as a Write Buffer for a Non-Volatile Memory; Inventor: John C. Rudelic.

* cited by examiner

ADAPTIVELY STORING SYSTEM CODE IN NON-VOLATILE STORAGE

BACKGROUND

This invention relates generally to storage and update of the operating system code, and more particularly, to storage and update of an image of system code in non-volatile storage.

Non-volatile storage may be well suited to long term storage of code and data in some cases. As one example, in a mobile network device, a non-volatile memory may store operating system code that may include the operating system, drivers, and applications. Using a software application, an original image of the operating system code may be installed within a non-volatile memory array in the form of an object. Often the operating system, drivers, and applications are combined into a single, large monolithic object. Before storing or installing the original image in a non-volatile storage, non-volatile file systems combine the operating system, drivers, and applications into a compiled image. Compiling may be used to link the operating system code into the single, large monolithic object that is installed as one code component for that image.

However, such a large monolithic object can only be updated or changed as a whole. Flash memory file systems use a code manager to modify or update a driver, an application, or the operating system of an original compiled image (e.g., original equipment manufacturer (OEM) image) stored as a relatively large single unit of the operating system code. For embedded systems, use of one large single object including the operating system, drivers and applications fails to provide the flexibility to update sections of the operating system code, as the entire image may need to be replaced, consuming a significant amount of time. Thus, operating system or driver patching, updates and addition of code to a system may not be feasible. Moreover, memory read and program performance varies significantly between different types of flash memories used to store the operating system code. For example, it takes a relatively longer time to access data from one type of flash memory than is the case with other types of flash memories. Also, without re-writing the entire image, tuning of the system based on an individual's usage of the device may not be supported.

Thus, there is a continuing need for alternate ways to store and update the system code, especially an image of operating system code in non-volatile storage.

DETAILED DESCRIPTION

Figure 1:
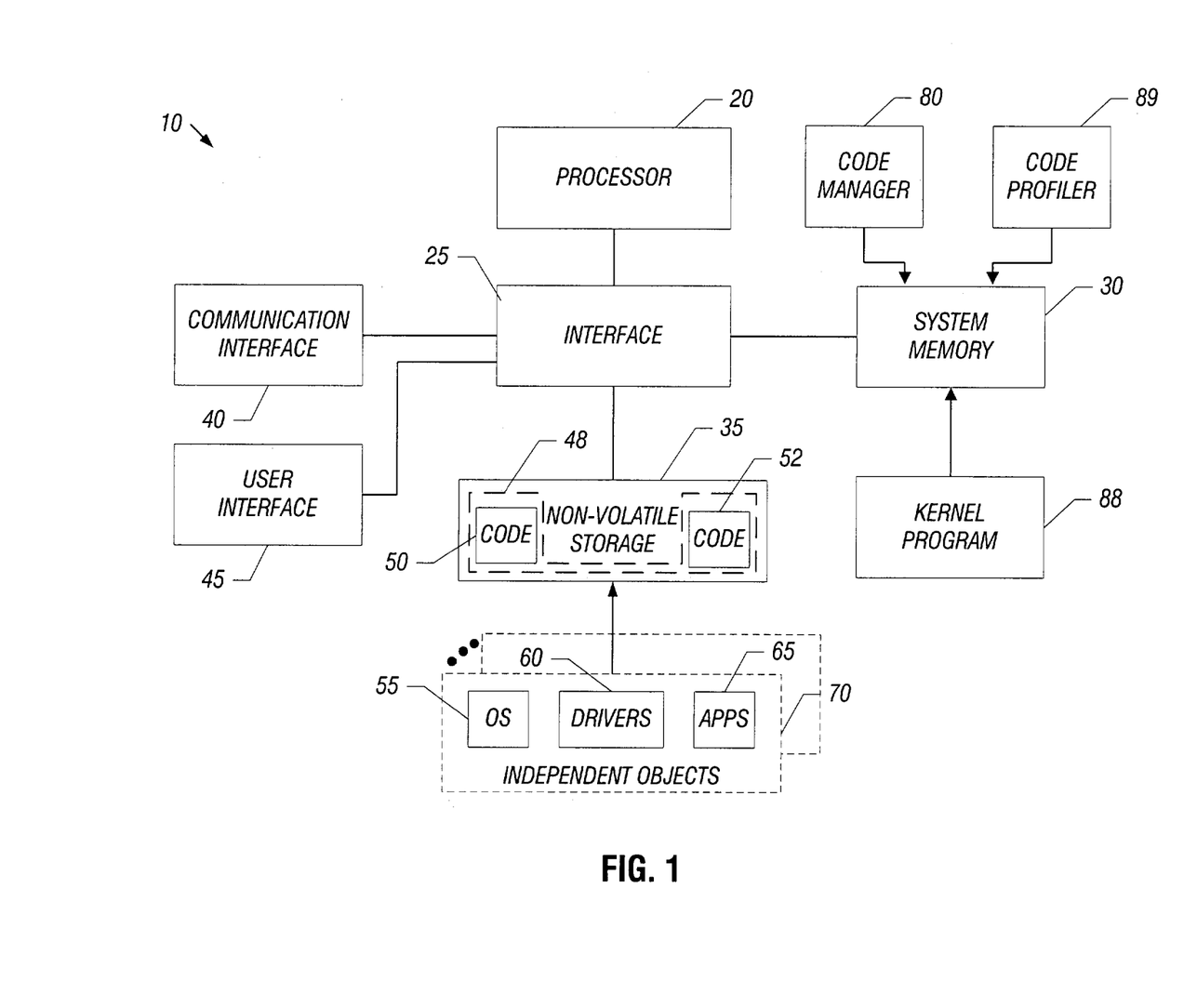
FIG. 1 is a depiction of a system including a non-volatile storage consistent with one embodiment of the present invention.

Referring to FIG. 1, a system 10 may include a processor 20, coupled through an interface 25, to a system memory 30 and a non-volatile storage device 35 in accordance with one embodiment of the present invention. The interface 25 may couple a communication interface 40 and a user interface 45 to the processor 20. The system 10 may be any processor-based system that uses the non-volatile storage device 35 for adaptively storing and updating of code and/or data. In one embodiment, the non-volatile storage device 35 may store an original image of operating system code 48 into at least two code portions, code portion 50 and code portion 52, both of which are separately accessible. In another embodiment, segmentation of code other than the operating system code 48 may be possible. For instance, a portion of the operating system may be swapped out for an application that is used more frequently.

In one embodiment, the system 10 may adaptively adjust the storage of the original image of the operating system code 48 across the non-volatile storage device 35. The operating system code 48 may include an operating system 55, drivers 60 for operating the system 10 hardware, and applications 65 that run on the operating system 55. The code portions 50 and 52 may be movably stored within the non-volatile storage device 35. As executables, the code portions 50 and 52 may be selectively replaced, partially updating the original image of the operating system code 48. In this way, rather than combining the operating system 55, drivers 60 and the applications 65 into a single monolithic code component, which is then installed in a non-volatile memory, the system 10 may support operating system patching or driver updates, and adding of additional code to the operating system code 48. As a result, the system 10 may be tuned to support the individual's usage of the operating system code 48 without having to re-write the entire image.

An embedded system is any non-personal computer system or computing device that performs a dedicated function or is designed for use with a specific embedded software application. The system 10 may be an embedded system capable of computing and/or communication for a mobile or a battery-powered portable system, a cellular or mobile phone, a personal digital assistant (PDA), or a wireless access device, to mention a few examples. In a closed environment, such as an embedded system or in a real time operating system (RTOS), the operating system 55 may run different devices, including a personal digital assistant or a tablet using the original image of the operating system code 48 consistent with one embodiment. An embedded system may be single-function or task-specific devices in which the operating system 55 and applications 65 are customized and then "locked down" before deployment, closing the embedded systems for any modification from an end user. Examples of some embedded systems include information kiosks, cash registers, automatic teller machines (ATMs), industrial controllers, server appliances, medical monitors, set top boxes, advanced consumer electronics, and handheld devices. Embedded operating systems are usually highly customized for a specific function and may be optimized for special hardware or a specific application in many situations. The scope of the present invention is not limited to embedded systems since other systems capable of storing a volatile memory state are well within the scope and spirit of different embodiments of the present invention.

According to one embodiment of the present invention, a real time operating system is one element of a complete real-time system that comprises the operating system 55, and applications 65. The real time operating system enables real-time performance for real-time applications. A real-time application may be an application designed to manage time critical systems, such as manufacturing process controls, high-speed data acquisition devices, or telecommunications switching equipment. One of the unique characteristics of a real-time application is that it not only provides the correct response, but also responds within a specified period.

While the processor 20 may be a conventional, general-purpose processor or a digital signal processor, as two examples, the non-volatile storage device 35 may be any suitable non-volatile memory, such as a semiconductor non-volatile memory. One example of the semiconductor non-volatile memory is a flash memory including a multi-plane flash memory or a multiple array flash memory. A flash memory typically includes a non-volatile array. Access to the non-volatile array may be controlled by code management software. For example, any type of erasable, programmable memory that can be conventionally and electrically arranged or programmed may be used. Of course, other suitable memories may be deployed in various embodiments depending upon a particular application without deviating from the spirit of the present invention.

The system memory 30 may comprise a random access memory (RAM) to store updateable data or programs and a read only memory (ROM) to store the programs or data that do not require any update during execution. The communication interface 40 may enable communications over a network, providing access to the non-volatile storage device 35. For example, wireless or wired communications to and from the system 10 may be established over a communications network. Likewise, the processor 20 may utilize the communication interface 40 for storage and retrieval of code and data to and from the non-volatile storage device 35 in some embodiments of the present invention.

An example of the communication interface 40 includes a transceiver incorporating an associated antenna for sending and receiving wireless data and information over a wireless network. Consistent with yet another embodiment, non-wireless systems may be implemented in which the communication interface 40 may exchange network traffic on one or more buses. In one embodiment, the system 10 including the processor 20, the interface 25, the system memory 30, and the non-volatile storage device 35 may be located on a single integrated circuit die.

The applications 65 may be loaded for execution into the non-volatile storage device 35. In some embodiments of the present invention, an application may be stored contiguously within the non-volatile storage device 35 as an executable program which may be directly executed in place without using the RAM in the system memory 30, forming an execute-in-place (XiP) application.

Conventionally, flash and other non-volatile file systems combine a compiled image before storing the image in the memory. Compiling is a process that links operating system code into a single, larger monolithic unit that is stored as one code component. By combining the operating system code 48 into a relatively large single unit, flash file systems typically spend a significant amount of time modifying or updating a driver, an application or the operating system. An example of the original image is an original equipment manufacturer (OEM) image that is conventionally stored in the flash memory.

Unlike a single component approach, the operating system code 48 may be modularly stored in the form of objects within the non-volatile storage device 35 in one embodiment. An object is a granularity of an executable. A granularity is the minimum amount of code that can be partitioned or fragmented while maintaining a form of the code which can execute. For storage and/or installation, the operating system code 48 may be broken into one or more independently executable code objects 70 having corresponding object data, such as metadata associated externally to indicate object identifying information. This metadata may allow the operating system 55 to be stored physically contiguously, rather than logically contiguously in some embodiments.

Figure 2:
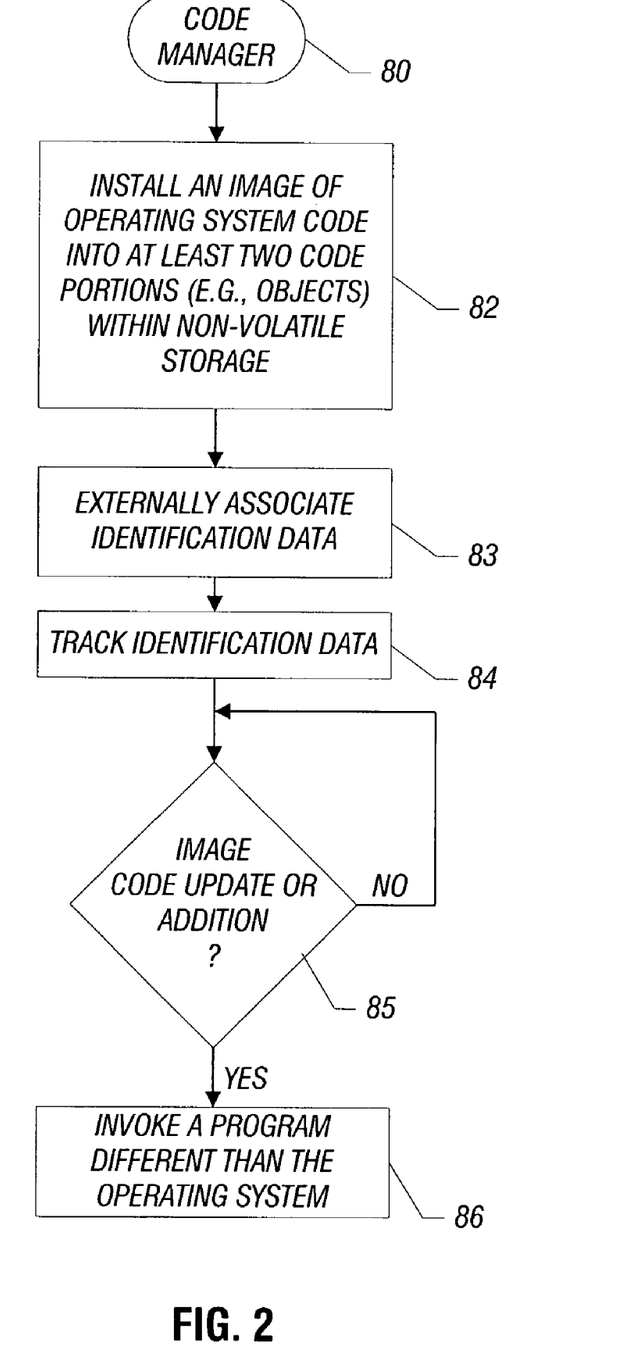
FIG. 2 is a flow chart for a code manager that installs and manages an image of operating system code in accordance with one embodiment of the invention.

In order to access the operating system code 48 within the non-volatile storage device 35, a code manager 80, may be utilized as shown in FIG. 2, in some embodiments of the present invention. Using the code manager 80 on the system 10, the operating system code 48 may be accessibly installed in the non-volatile storage device 35. In this example, the code manager 80 may be executed by the operating system 55 on the system 10. A partial addition or update of the operating system code 48 may be implemented, for example, to load an embedded system/operating system in a mobile device, such as a cellular phone.

Referring to FIG. 2, the code manager 80 may be implemented in software, in one embodiment, for installing and managing a fragmented image of operating system code in accordance with one embodiment of the present invention. Specifically, an image of the operating system code 48 may be installed into at least two code portions 50, 52 within the non-volatile storage device 35. At block 82, the code manager 80 may install an original image of the operating system code 48 in at least two code portions 50, 52. The code manager 80 may be a software application that manages code portions 50, 52 installed as the independently executable code objects 70 in the non-volatile storage device 35. For instance, execute-in-place (XiP) code objects may be installed in a contiguous, linear fashion, as the code manager 80 may have knowledge of low-level flash programming routines and may be capable of controlling the installation process. One exemplary implementation of the code manager 80 is in the code management software, Flash Data Integrator (FDI) Code Manager available from Intel Corporation of Santa Clara, Calif., USA.

The code manager 80 may be used to externally associate object identification data with the independently executable code objects 70 as indicated in block 83 consistent with some embodiments. For the purposes of managing the storage and update of the operating system code 48, the code manager 80 may track the identification data at block 84. A check at diamond 85 may detect whether an update or addition of code is indicated for the original image of the operating system code 48. If so, the code manager 80 may invoke a kernel program 88 at block 86. The kernel program 88 is a small program that is capable of managing the system 10 in the absence of the operating system 55 (FIG. 1). Otherwise, the code manager 80 may continue to track the identification data in many embodiments of the present invention.

Normally an operating system cannot be patched or updated while it is running. However, when the operating system 55 is to be modified, the kernel program 88 may be invoked by the code manager 80. The kernel program 88 may read and write from the non-volatile storage device 35, updating the operating system 55. The kernel program 88 may run as the operating system proxy while an update of the operating system 55 is in process. The kernel program 88 may be pre-installed in the non-volatile storage 35 in some embodiments of the present invention.

In operation, the kernel program 88 may be loaded into the system memory 30, separately from the operating system 55, to partially update the original image of the operating system code 48. In addition, the system memory 30 may store a code profiler 89 to determine the relative utilization of the multiplicity of independently executable code objects 70 for use by the kernel program 88, as illustrated in FIG. 1. However, in another embodiment, the code profiler 89 may be used to track use of different methods of execution that may be deployed. For example, a selection may be made to enable direct execution of code portions 50, 52 from the non-volatile storage 35 as opposed to carrying out execution from a random access memory (RAM) in the system memory 30.

In some embodiments, the operating system 55 may be a real time operating system or an embedded system that may be broken into many executable code objects, the multiplicity of independently executable code objects 70. The kernel program 88 may independently manage the code portions 50, 52 as the independently executable code objects 70 and tune the system 10 to match a usage pattern of the operating system code 48 installed on the system 10, according to one embodiment of the present invention. In one case, a usage pattern refers to the relative utilization of the code portions 50, 52 by a user on a device. Based on the usage pattern, the kernel program 88 may patch the operating system 55 or the drivers 60.

Likewise, while the code manager 80 may manage the independently executable code objects 70, the code profiler 89 may monitor the usage patterns of the independently executable code objects 70 on the system 10. In this manner, the kernel program 88 may enable flexible modularization and system code update or modification, that is not supported by conventional systems.

To manage the operating system code 48, the code manager 80 may maintain a table of management information for the metadata associated with the installed independently executable code objects 70 in some embodiments. In other embodiments, the management information may be interleaved with the independently executable code objects 70. The kernel program 88 may manage the operating system 55 in addition to the applications 65 for the code manager 80. In order to manage the operating system 55, the kernel program 88 may be located outside an operating system image, controlling the updating of the operating system code 48.

However, the kernel program 88 may have any structure that defines one or more attributes of the operating system code 48 suitable for code management. These attributes may include parameters that are modified over time, such as statistics of utilization or execution frequency of the independently executable code objects 70 tracked by the code profiler 89, providing management information to the kernel program 88. Basic information including start address and application size may be stored locally in the kernel program 88 upon installation. Such basic information may enable relocation, as well as updating of the pre-installed code portions of the operating system 55 within the operating system code 48.

In this manner, the kernel program 88 may use these attributes to enable the addition of code onto the non-volatile storage device 35. The device 35 may already contain an image fragment in the form of the code portion 50 of the operating system code 48. That fragment may represent one missing specific driver of the drivers 60. In a particular embodiment, this system loading capability of the kernel program 88 may be extended to complement a platform builder utility that stores relevant code object information for the independently executable code objects 70 in a particular implementation of the system 10.

In operation, an original image of the operating system code 48 may be installed into the multiplicity of independently executable code objects 70 on the non-volatile storage device 35. A code object may include associated management information that enables the code profiler 89 to determine the relative utilization of the multiplicity of independently executable code objects 70. The code profiler 89 may monitor the management information in some embodiments of the present invention. Based on this monitoring, the utilization of the independently executable code objects 70 may be profiled.

To enable addition of code to a specific code portion, such as the code portion 50 of the operating system code 48 on the non-volatile storage device 35, an attribute indicative of the start address and code size may be defined within the kernel program 88. A targeted object among the multiplicity of independently executable code objects 70 may be automatically updated within the non-volatile storage device 35. In other embodiments, the code profiler 89 may update relevant structure fields of the independently executable code objects 70 that are managed as a record, to enable dynamic re-partitioning or repositioning of the code portions 50, 52 of the operating system code 48.

Consistent with certain embodiments of the present invention, in order to take control of the system 10 from the operating system 55, the kernel program 88 may trap a reset vector, trap the power-down sequence, or execute as an application. In the embodiment which involves trapping of a reset vector, the kernel program 88 may be installed in the conventional power on sequence. However, the kernel program 88 may be responsible for many system configuration issues or items such as the reset and chip select enables.

The embodiment that traps the conventional power-down sequence removes the need for the kernel program 88 to have knowledge of system configuration issues, as the normal power on sequence may configure the system 10. Advantageously, for a full-featured operating system (e.g., Microsoft® Windows® CE), the kernel program 88 may be called in the power-down sequence and may be executed after the operating system 55 has shut down prior to the system 10 shut down. Yet according to another embodiment, for a lightweight or relative operating system, the kernel program 88 may assume control from the operating system 55, performing the expected duties and resetting the system 10 without returning to the operating system 55, as the system 10 may be in an inconsistent state.

Figure 3:
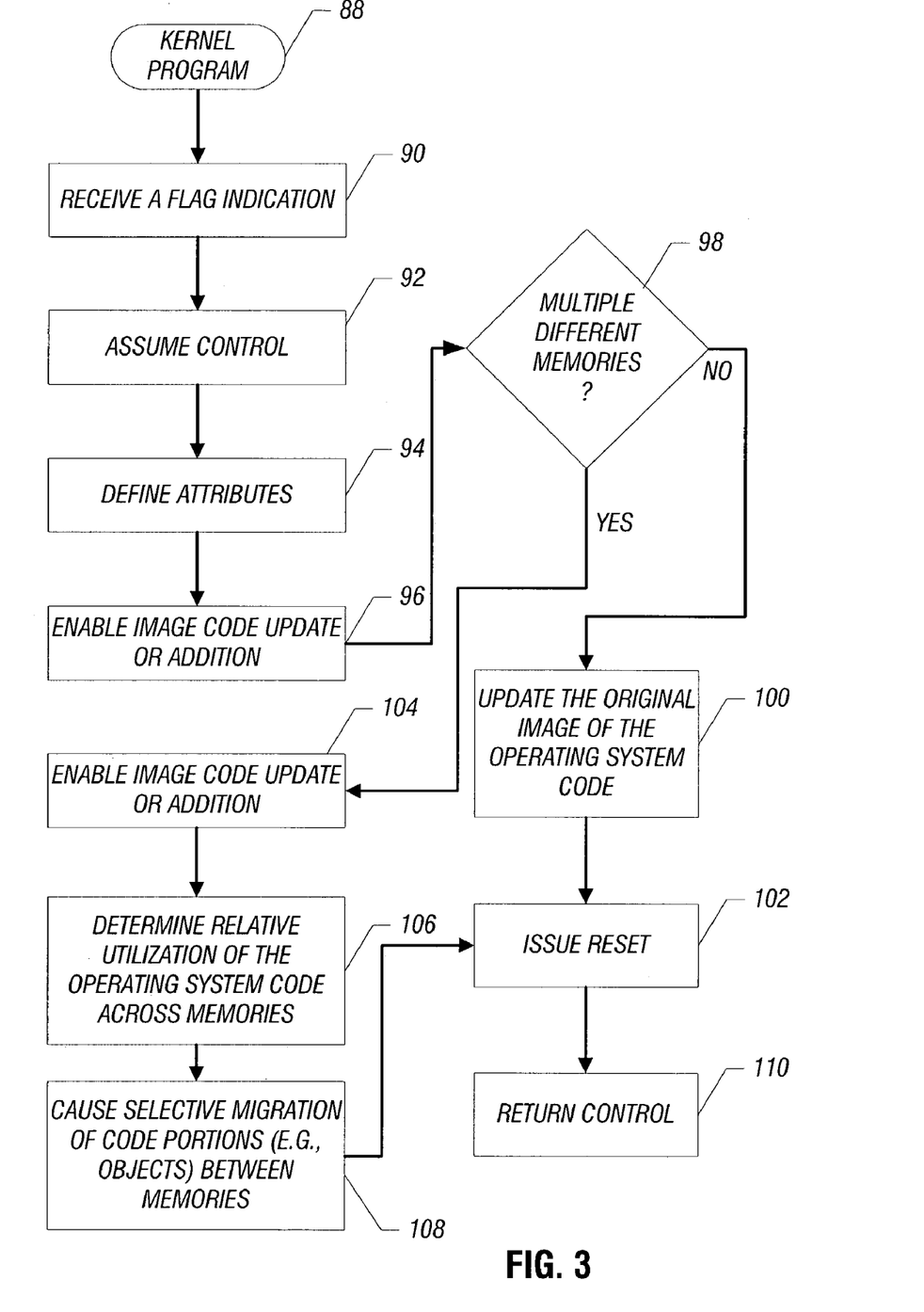
FIG. 3 is a flow chart for a kernel program which enables adaptive storage and update of the operating system code according to one embodiment of the present invention.

Referring to FIG. 3, the kernel program 88 may be implemented in software, enabling adaptive storage, and update of the operating system code 48 according to one embodiment of the present invention. A flag indication may be received, as shown in block 90, indicating the image code update or addition for the operating system code 48. At block 92, the kernel program 88 may assume control from the operating system 55. As described above, one or more attributes may be defined at block 94 for the impending update or addition of code to the operating system code 48. Using the attributes, at block 96, the kernel program 88 may enable the image code update or addition to the image of the operating system code 48, which may be an image fragment.

A check at diamond 98 may indicate the presence or absence of multiple different memories at the non-volatile storage device 35 shown in FIG. 1. For example, as least two different memories in a memory hierarchy may be included in the non-volatile storage device 35, according to one embodiment of the present invention. The two different memories may be flash memories with a marked difference in performance in one embodiment. When the non-volatile storage device 35 does not include multiple different memories, at block 100, the kernel program 88 may update the original image of the operating system code 48. Finally, to indicate completion of the update, a reset may be issued at block 102, for example, informing the operating system 55 in one case.

However, when at the diamond 98, multiple different memories are indicated, the kernel program 88 may receive relative utilization information concerning the code portions 50, 52 at block 104. At block 106, the kernel program 88 may determine the relative utilization of the operating system code 48 included in the code portions 50, 52 across the memories. The kernel program 88 may cause selective migration of the code portions 50, 52 of the operating system code 48 between the multiple different code portions located within the non-volatile storage device 35 at block 108 in some embodiments. After causing the migration of the code portions 50, 52 based on the utilization differences therebetween, the system 10 shown in FIG. 1 may adaptively adjust the storage of the original image of the operating system code 48 across the non-volatile storage device 35. In one embodiment, the kernel program 88 may adapt itself based on a profile of the relative utilization of the operating system code 48 that is stored within the non-volatile storage device 35. To indicate completion of such an adaptation, the kernel program 88 may issue the reset at block 102, as previously described. Finally, the kernel program 88 may return control at block 110 back to the operating system 55.

Figure 4:
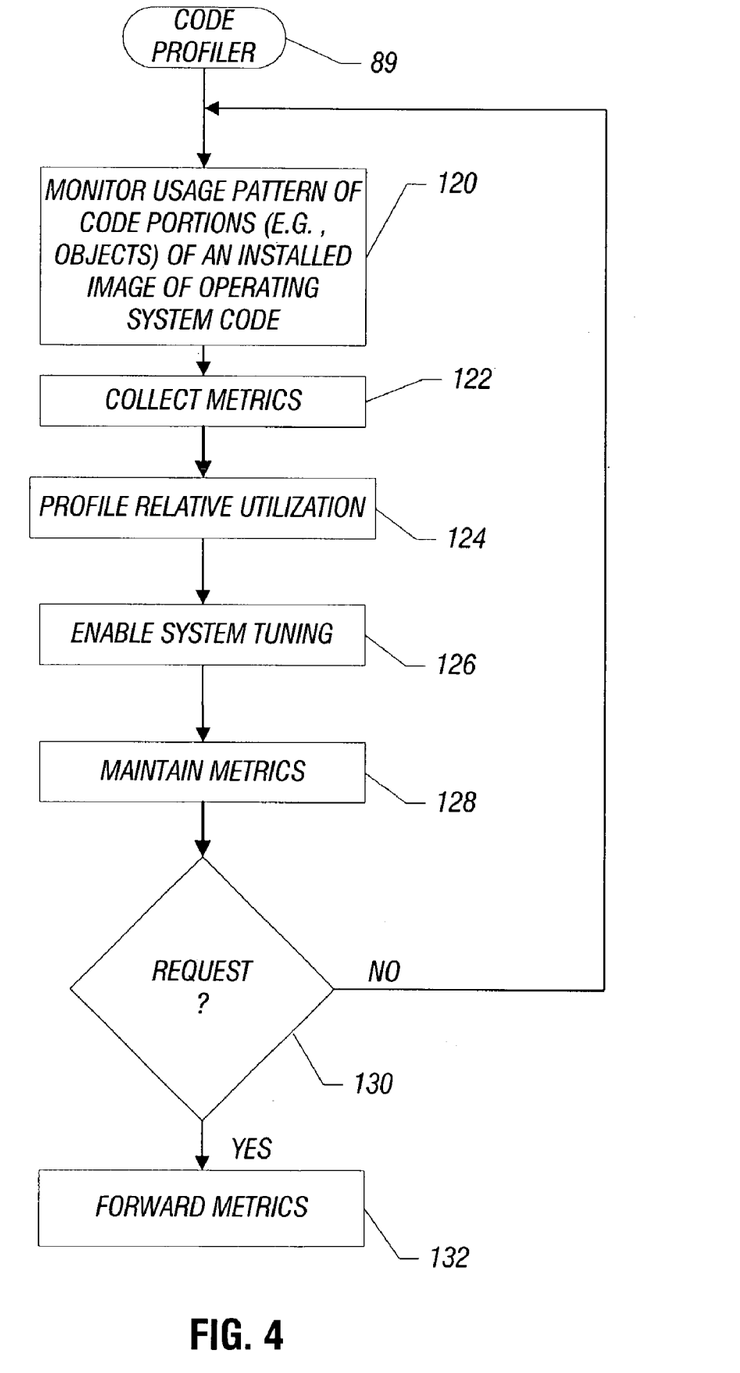
FIG. 4 is a flow chart for a code profiler that monitors the operating system code installed in the system shown in FIG. 1 according to one embodiment of the present invention.

As shown in FIG. 4, the code profiler 89 may monitor the operating system code 48 installed on the system 10 within the non-volatile storage device 35 in accordance with many embodiments of the present invention. To this end, the code profiler 89 may monitor usage pattern for the code portions 50, 52 of the original image of operating system code installed at block 120. At block 122, the code profiler 89 may collect metrics. At block 124, a profile for the relative utilization of the code portions 50, 52 may be formed.

System tuning for the system 10 may be enabled at block 126 in some embodiments, using the profile obtained at block 124 indicative of the relative utilization. The collected metrics at block 120 may be maintained at block 128 for further use by the code profiler 89 or distribution to third parties. A check at diamond 130 may determine whether the code profiler 89 from another party receives a request for the collected metrics. If so, at block 132, the maintained metrics may be forwarded to the requesting third party. Regardless, the code profiler 89 may iterate to gather the metrics for the code portions 50 and 52, profiling the usage thereof at the system 10 consistent with some embodiments of the present invention is contemplated.

Figure 5:
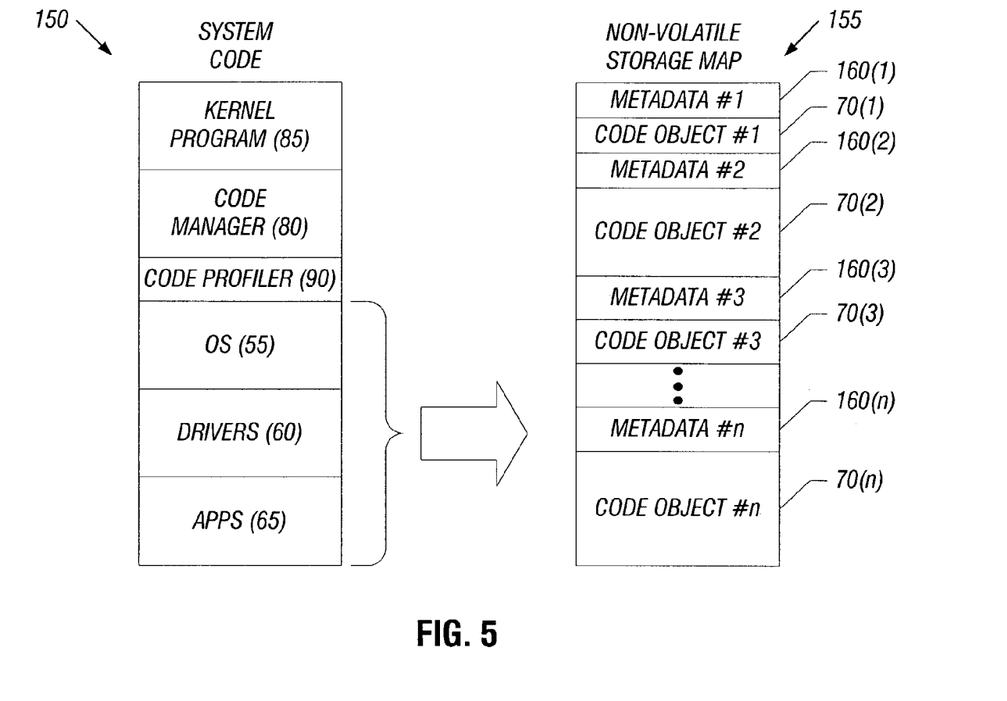
FIG. 5 is a schematic depiction of one embodiment of the present invention.

A memory map 155 of an interleaved non-volatile storage device 35 is shown in FIG. 5 in which the operating system 55, the drivers 60, and the applications 65 of an operating system code image 150 may be installed as independently executable code objects 70(1) through 70(n) separated by externally associated metadata 160(1) through 160(n) rather than as just a single, monolithic object. For accomplishing code management, two different scenarios consistent with some embodiments involve either pre-installing the kernel program 88 and the code manager 80 in the system 10 or building the operating system 55 on the system 10 in a format enabling code management of independently executable code objects 70(1) through 70(n).

In the pre-installed option, the non-volatile storage device 35 may be delivered with both the kernel program 88 and the code manager 80 loaded therein. To install the operating system 55, a series of installation requests may be passed to the code manager 80, building the operating system code image 150. The code manager 80 may store basic attribute information about each code object, enabling the code management thereof.

According to another option, a software developer may use a linking process to build an image of the operating system 55 that includes management structures interleaved within the operating system code 48 shown in FIG. 1. This image may be mass programmed in a factory environment, essentially removing any issues associated with the installation sequence. Since the linking process creates the image, the independently executable code objects 70(1) through 70(n) may appear actually installed to the code manager 80. The management structures may be interleaved with the independently executable code objects 70(1) through 70(n). Accordingly, the code management may be performed within an image that includes a code management application such as the code manager 80.

For some embodiments, the system 10 may notify the code manager 80 in advance, as to when an object is to be referenced at the non-volatile storage device 35, preventing the specific object from being relocated therefrom while it is running. This notification may be leveraged as a count to accumulate the number of references to a specific object. The code profiler 89 may be useful to any system where there is a large discrepancy between the execution performance of the individual code objects 70(1) through 70(n). By way of an example, one scenario involves a situation when the highest performance flash memory is available in a limited supply at the non-volatile storage device 35. However, the code profiler 89 may be especially valuable for systems with multiple execution memories or memories of varying performance, such as those containing multi-chip packages or an integrated flash.

Thus, the code profiler 89 may cause the storage of the installed code objects 70(1) through 70(n) to be optimized on the system 10 based on the usage patterns such as that of a device. An example of the device is a portable device, which may be capable of network communications. In the system 10 shown in FIG. 1, when the non-volatile storage device 35 may comprise multiple non-volatile memories, the code objects that are commonly executed may be installed in a higher performance non-volatile memory, while the other code objects that are rarely executed may be shifted to a slower non-volatile memory.

Figure 6:
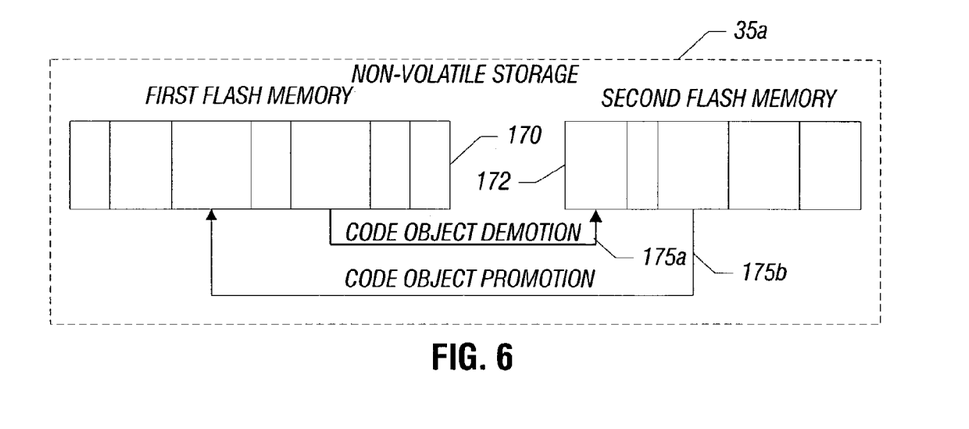
FIG. 6 is a schematic depiction of a non-volatile memory according to an embodiment of the present invention.

A non-volatile storage device 35a, as shown in FIG. 6 includes a first flash memory 170 and a second flash memory 172 in accordance with one embodiment of the present invention. In one embodiment, the first flash memory 170 may be different than the second flash memory 172 at least in one relative performance metric, such as the rate of power consumption or the response time to an access request. Blindly installing an operating system and/or consuming the high performance first flash memory 170 may not be very efficient use of the non-volatile storage device 35a. The code profiling capability offered by the code profiler 89 coupled with the ability to manage the operating system 55 using the code manager 80 may result in minimally used portions of the operating system 55 and applications 65 migrating off the valuable high-performance first flash memory 170.

By allowing the more critical objects to migrate to the high-performance first flash memory 170, an improved user experience may result in multiple embodiments of the present invention. Accordingly, the system 10 that includes the non-volatile storage device 35a may auto-tune itself to the actual device usage patterns of the objects. In this way, the system 10 may benefit from flexible modularization and a partial system code update and modification.

In one embodiment that utilizes the code profiler 89, the relative utilization of the operating system code 48 included in the installed code objects 70(1) through 70(n) may be tracked for self tuning by the system 10. In doing so, a code object that is often used will migrate to the high performance first non-volatile memory 170 (as shown by a code object promotion arrow 175b in FIG. 6), while another code object that is rarely used will migrate to the low-performance non-volatile memory 172 (as indicated by a code object demotion arrow 175a).

Consistent with an embodiment of the present invention, metrics that may be gathered to track the relative utilization, include the number of updates, type of update, version of object, frequency of use, application performance and any other metrics that indicate the usage patterns and value of the individual code objects within the system 10. As such, systems that incorporate a flash memory are uniquely suited to the metrics collection/communication process because the flash memory may enable the system 10 to maintain the metrics until requested by a network. In a system where profiling is performed, the metrics that are gathered may offer value to a) the user of the system 10, b) the owner of the system 10 (in the case of an enterprise client device) and c) the network operator.

In one system example, use of the management information interleaved with each of the individual components of the system 10, such as the operating system, drivers 60, and applications 65, system code may be installed in a fashion that does riot preclude management of the individual components that comprise the operating system code 48. The system 10, such as an embedded or legacy system, may be updated as desired, supporting over-the-air code updates, bug fixes, and code patches, as a few examples. Moreover, the installation of additional applications, as requested, or the installation and management of an enterprise footprint, metrics collection of the updates, type and frequency, and relaying of the metrics information to the network operator may be provided on the system 10.

With some embodiments, insertion and creation of the management information for managing the operating system code 48 image in conjunction with adaptive code profiling may enable the system 10 to utilize the best memory in the hierarchy for code execution, based on the characteristics of individual code segments, independently of the software developer's specific knowledge of the underlying hardware platform, which may maximize performance/power tradeoffs. By gathering metrics and saving the metrics in a system including the system 10, additional value may be provided to the user of the system, the owner of the system, the owner of the network and the developer(s) of applications and/or hardware in some embodiments.

Figure 7:
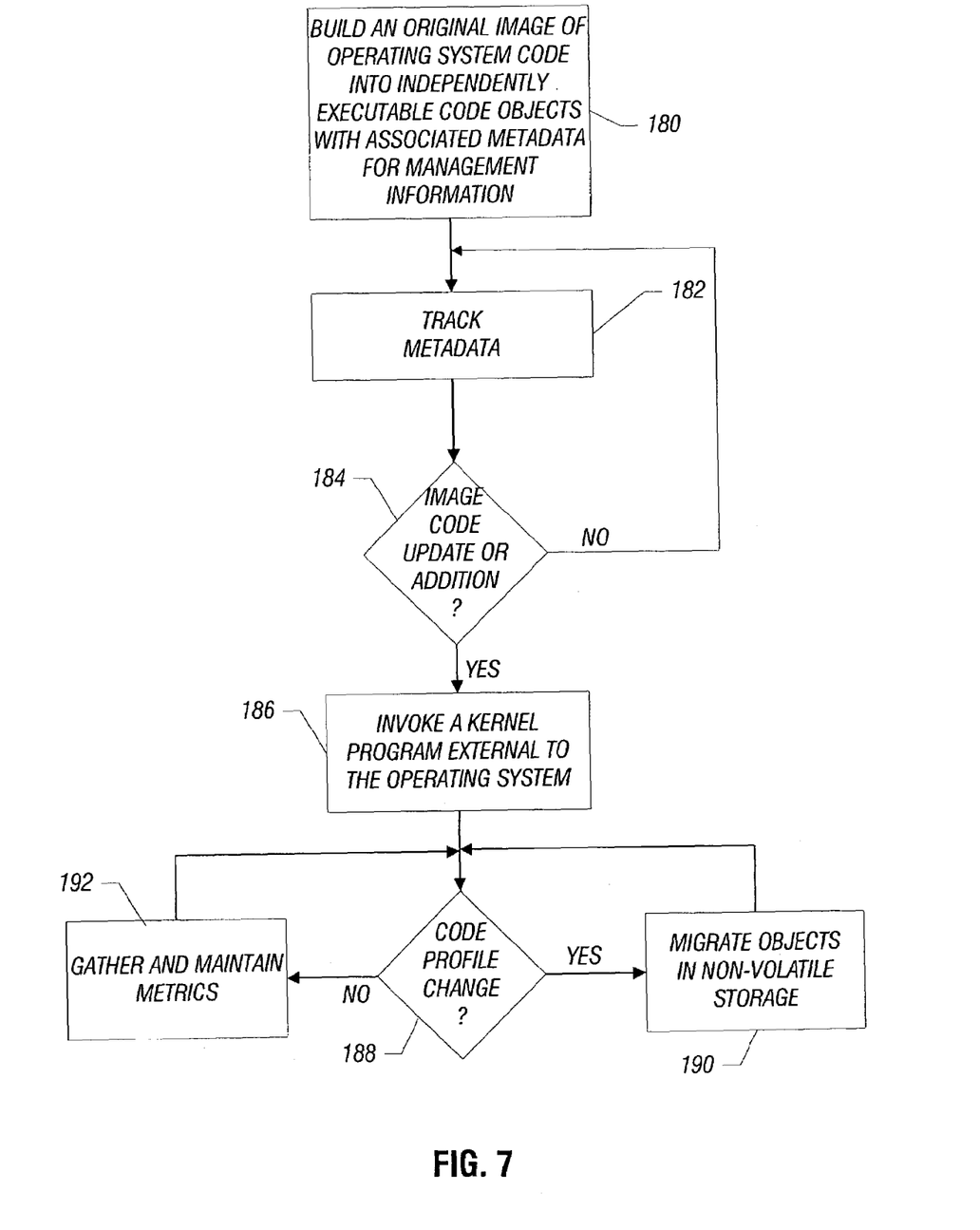
FIG. 7 is a flow chart consistent with one embodiment of the present invention.

In connection with the embodiment shown in FIG. 7, the code management for the system 10 of FIG. 1 may be implemented in software, firmware, hardware, or any combination thereof. In accordance with one embodiment of the present invention, the operating system code image 150 shown in FIG. 5, may be stored within the non-volatile storage device 35 in at least two objects, such as the multiplicity of independently executable code objects 70 shown in FIG. 5, based on the relative utilization of the operating system code 48 in the two objects. At block 180, the operating system code image 150 may be built into at least two objects while identification data, such as metadata 160 may be associated to adaptively store the operating system code 48. At block 182, the identification data may be tracked for the independently executable code objects 70. A check at diamond 184 may indicate whether an image code update or addition is indicated. If yes, the kernel program 88, which is external to the operating system 55, may be invoked at block 186. Otherwise, an indication for the image code update or addition may be monitored.

Another check at diamond 188 may ascertain whether the code profile is changed. That is, the code profiler 89 shown in FIG. 1 may continue to monitor the utilization of the objects using the associated identification data, in some embodiments of the present invention. When a change in the code profile is indicated for the operating system code image 150, based on the relative utilization of the operating system code in the objects, one or more objects, such as the independently executable code objects 70 may migrate across the non-volatile storage device 35, as indicated at block 190. Conversely, if no change in the code profile is indicated for the operating system code image 150, meaning image code update, or addition is not indicated, the code profiler 89 may continue to gather and maintain metrics at block 192.

Thus, in some embodiments, the system 10 shown in FIG. 1 may manage the code components of an existing operating system without modifications to the operating system by interleaving the management information with the entire embedded system. Collection of metrics for the individual code components of the embedded system, while maintaining the metrics information and forwarding the metrics to another party, may be provided as well. Using code profiling, usage pattern of product architectures including that of a chipset or a processor-based system may also be obtained. In this manner, kernel management may be improved in the operating system software development in some embodiments. Any system containing volatile and/or non-volatile memory may benefit from one or more of these features, as enumerated above in the context of an embedded system.

Providing a first and a second storage device, said first storage device different than said second storage device and a program different from an operating system, said program to store separately accessible portions of an original image of system code within said first and second storage devices. The first and second storage devices may be a multiphase flash memory.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   storing within a non-volatile storage device an original image of operating system code in at least two separately accessible portions of code;
   collecting utilization information for each of the multiplicity of the independent code objects stored in one of said at least two separately accessible code portions; and
   using a kernel external to said operating system to dynamically repartition the original image of the operating system between the two separately accessible portion code based on the utilization information by moving code objects from one portion to the other.

2. The method of claim 1 including:
   externally associating identification data with said at least two code portions;
   tracking said identification data for said at least two code portions;
   using at least two different memories for the non-volatile storage device; and selectively causing migration of said at least two code portions between said at least two different memories based on said identification data.

3. The method of claim 1 including using a program different than an operating system to update the original image based on the relative utilization of the system code in said at least two code portions.

4. The method of claim 3 including installing the original image of the system code into a multiplicity of independent code objects on the non-volatile storage device, each independent code object having associated management information.

5. The method of claim 3 including:
using at least one of two or more different memories and two or more methods for storage and execution for the non-volatile storage device;
using a program different than an operating system to define an attribute that enables addition of code to the system code on the non-volatile storage device; and
automatically updating the multiplicity of independent code objects across said at least one of two or more different memories and two or more methods for storage and execution based on the attribute.

6. The method of claim 4 including interleaving the management information with the entire original image of the system code;
monitoring the management information; and
based on the monitoring, profiling the utilization of said multiplicity of independent code objects.

7. The method of claim 1 including identifying a usage pattern of a device by a user and tuning an embedded system on the device to match the usage pattern.

8. The method of claim 7 including maintaining information for the usage pattern based on said one or more metrics, and in response to a request, providing the information on said one or more metrics from the device.

9. The method of claim 1, wherein said system code includes an operating system, at least one driver, and at least one application.

10. A computer program product comprising a computer storage medium storing instructions that, when executed, enable a processor-based system to store within a non-volatile storage device an original image of operating system code in at least two separately accessible code portions, collect utilization information for each of the multiplicity of the independent code objects stored in one of said separately accessible code portions and use a kernel external to said operating system to dynamically repartition the original image of the operating system code based on said utilization information by moving code objects from one portion to the other portion.

11. The product of claim 10 further storing instructions that enable the processor-based system to:
externally associate identification data with said at least two code portions;
track said identification data for said at least two code portions;
use at least two different memories for a non-volatile storage device; and
selectively cause migration of said at least two code portions between said at least two different memories based on said identification data.

12. The product of claim 10 further storing instructions that enable the processor-based system to use a program different than an operating system to update the original image based on the relative utilization of the system code in said at least two code portions.

13. The product of claim 11 further storing instructions that enable the processor-based system to install the original image of the system code into a multiplicity of independent code objects on the non-volatile storage device, each independent code object having associated management information.

14. The product of claim 11 further storing instructions that enable the processor-based system to:
use said at least one of two or more different memories and two or more methods for storage and execution for the non-volatile storage device;
use the program to define an attribute that enables addition of code to the system code on the non-volatile storage device; and
automatically update the multiplicity of independent code objects across said at least one of two or more different memories and two or more methods for storage and execution based on the attribute.

15. A non-volatile memory comprising:
a first and a second storage device, said first storage device different than said second storage device; and
a program different than an operating system, said program to store separately accessible portions of an original image of operating system code within said first and second storage devices, collect utilization information for each of the multiplicity of the independent code objects stored in one of said separately accessible portions and use a kernel external to the operation system to dynamically repartition the original image of the operating system code based on said utilization information by moving code objects from one portion to the other portion.

16. The memory of claim 15, wherein said first and second storage devices form a multi-plane flash memory.

17. The memory of claim 15, wherein said first and second storage devices comprise at least two different flash memories.

18. The memory of claim 17, said first device to store a profiler to profile the utilization of said multiplicity of independent code objects for use by the program.

19. The memory of claim 15, wherein said first and second storage devices include the original image of the system code installed into a multiplicity of independent code objects, each independent code object having associated management information.

20. The memory of claim 19, wherein said program is a kernel program.

21. The memory of claim 15, wherein said system code includes an operating system, at least one driver, and at least one application.

* * * * *